Jan. 14, 1969  R. D. HILDEBRANDT  3,421,991
PREPARATION OF CARBON AGGREGATE
Filed March 22, 1966  Sheet 2 of 2

INVENTOR
RICHARD D. HILDEBRANDT
BY
ATTORNEY

United States Patent Office 3,421,991
Patented Jan. 14, 1969

3,421,991
PREPARATION OF CARBON AGGREGATE
Richard D. Hildebrandt, Cupertino, Calif., assignor to Kaiser Aluminum & Chemical Corporation, Oakland, Calif., a corporation of Delaware
Filed Mar. 22, 1966, Ser. No. 536,452
U.S. Cl. 204—294                    5 Claims
Int. Cl. B01k 3/08

This invention relates to an improved method for preparing carbon material of graded size distributions and specified bulk densities. More particularly, it relates to improvements in a method for preparing carbon material for anode and cathode electrodes by blending various size fractions of a conventional carbon-coke material to form a graded size distribution which gives a desired green bulk density.

In the preparation of carbon material for anode and cathode electrodes, particularly electrodes for aluminum reduction cells, the conventional procedure is to crush and mill material as received, for example, coal or coke and classify it into coarse, intermediate and fine fractions. Portions of each fraction are then combined in the proper proportion to form the desired size distribution which gives a maximum bulk density and serviceability and requires a minimum of binder to bond it together. It is essential, in attaining good electrode quality and economy of production, to maintain the same graded size distribution and bulk density and to minimize grinding and handling of the carbon material. Variations in size distribution and bulk density at a given binder addition level adversely affects electrode quality and excess grinding increases inorganic contamination.

Thus, the conventional procedure, although quite capable of producing good quality carbon material for anode and cathode electrodes, requires a considerable amount of equipment, such as crushing and grinding equipment, sizing and screening apparatus, etc. which is not only expensive to procure but is difficult and expensive to maintain. In addition, the conventional procedure outlined above does significantly increase the amount of iron contamination present in the carbon electrode material. For example, the carbon materials normally used for the preparation of anode and cathode electrodes contain about 0.01% iron. After being processed according to the above outlined conventional procedure, the iron contamination level in the carbon will rise to 0.06%–0.07% and not infrequently to 0.10%. This iron contamination, when the electrodes are used in an aluminum reduction cell, can eventually find its way into the molten salt bath in the cell and will ultimately show up as a contaminant in the aluminum produced. With the increasing demand for high purity metal generated by technological advances, it is becoming increasingly important to keep all contaminants to as low a level as possible.

Accordingly, the instant invention is concerned with providing a method for consistently attaining the same graded sized distribution and bulk density of carbon material. By practice of the instant invention, the amount of crushing, grinding, sizing and screening and other handling equipment necessary for the preparation of the carbon material is significantly reduced. Further, with the method of the instant invention, the pick-up of inorganic contaminants, particularly iron contamination is reduced to a negligible level. A further advantageous aspect of the invention is that it results in stronger aggregate characteristics for the carbon anodes or cathodes because of the preferential crushing of weak or porous particles in the carbon material which leads to stronger electrode bodies. Additionally, it has been found that less binder is required with the carbon material prepared in accordance with this invention.

The instant invention relates to an improvement in the method for preparing carbon material for anode and cathode electrodes by blending various size fractions of a conventional carbon coke material to form a graded size distribution which gives a desired green bulk density comprising pressure crushing in a confined chamber the as-received coarse carbon material at a pressure whereby the weaker particles will crumble and fill in between the stronger particles until there is sufficient dove tailing to bear the full pressure load without degradation so as to obtain a natural and reproducible particle size distribution having a specific first bulk density and thereafter adding fine particle size material so as to obtain the desired particle size distribution and second bulk density. A suitable binder may then be added to the mixture and the mixture formed in the normal manner to give a carbon body having the desired green bulk density.

It is not completely understood why a uniform particle size distribution and bulk density can be consistently achieved by a one step pressure crushing but it is postulated that there is enough variation in the friability of the original particles so that some of the particles break down and others do not. However, sufficient particles do break down in varying degrees to consistently give a high density aggregate having a reproducible particle size distribution and bulk density. The friability of the particles is such that the particles are automatically crushed to varying degrees.

This invention may be best understood by reference to the following description taken in connection with the accompanying drawings. In the drawings.

Figure 1:
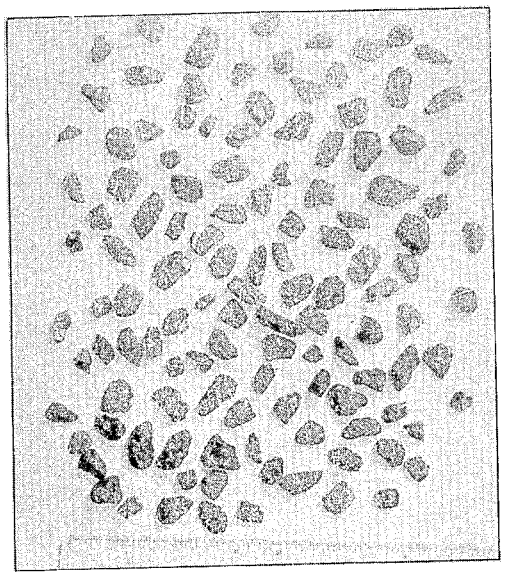
FIG. 1 is a photograph of a typical carbon material before treatment in accordance with this invention.
Figure 2:
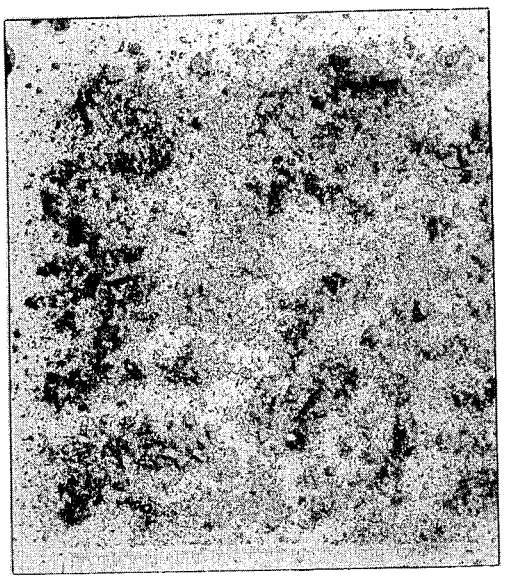
FIG. 2 is a photograph of the same carbon material after it has been treated in accordance with this invention.

The materials commonly used in the aluminum reduction industry for anode and cathode electrodes are petroleum coke, gas calcined to about 1200° C. for anodes and anthracite coal either gas calcined at about 1200° C. or electrically calcined at about 1800° C. for the cathodes. Normally the as-received material consists essentially of 100% plus 4 Tyler Screen Mesh particle screen sizes. FIG. 1 shows such an electrically calcined anthracite coal starting material. FIG. 2 shows this starting material after it has been prepared in accordance with the instant invention by pressure crushing at about 5000 pounds per square inch.

Figure 4:
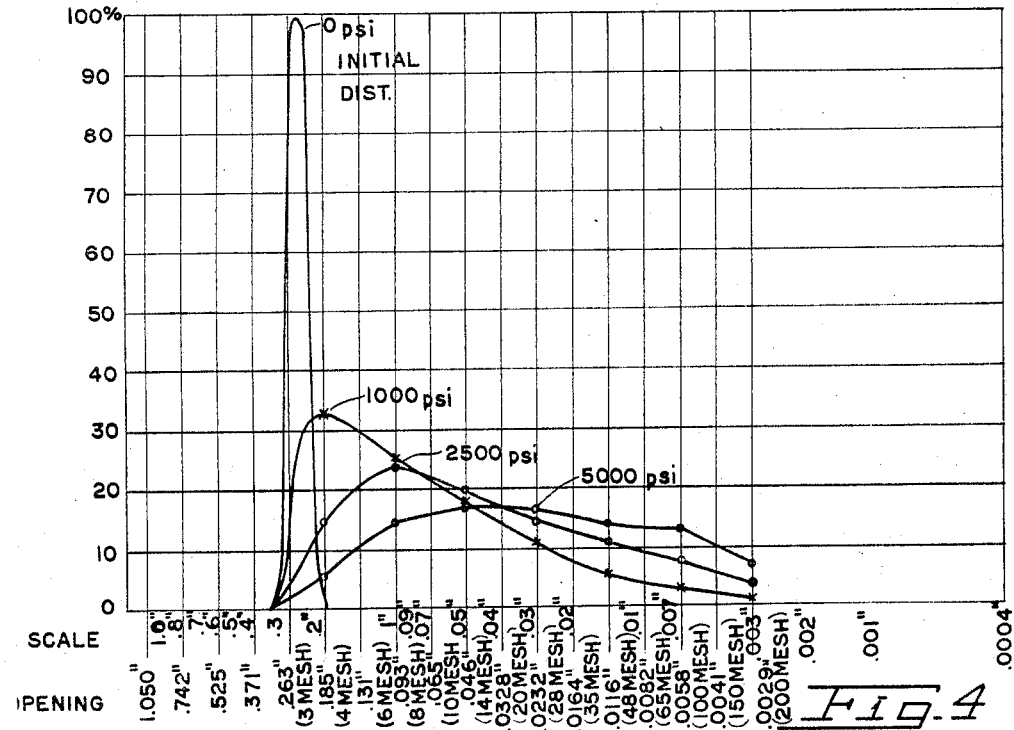
FIG. 4 is similar to FIG. 3 except that the material being treated is petroleum coke.
Figure 3:
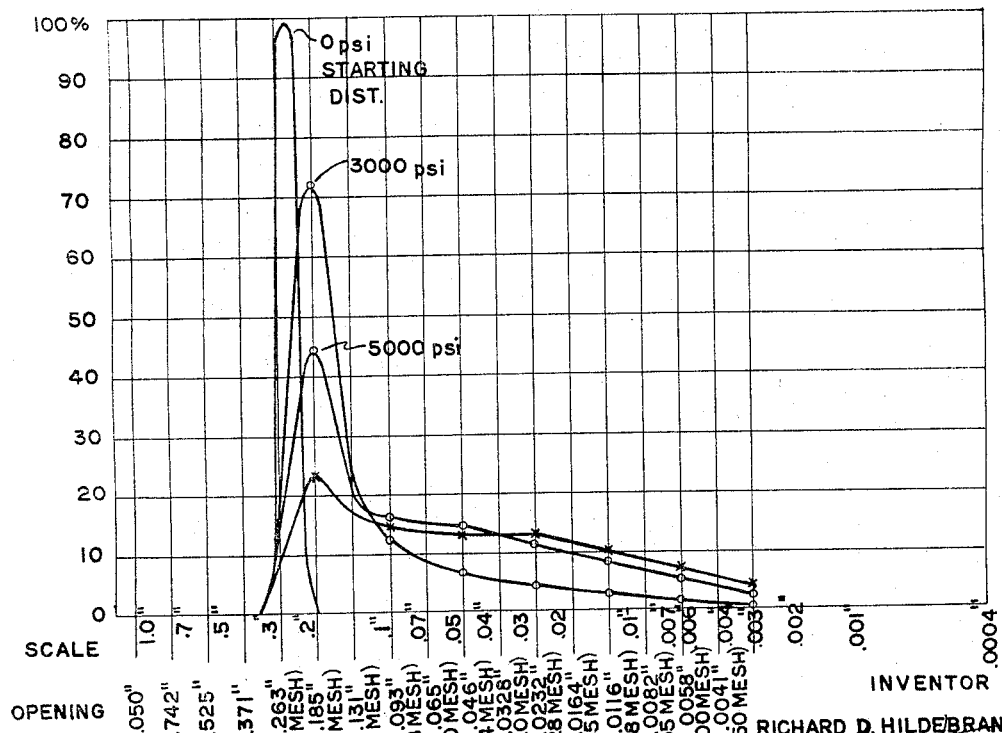
FIG. 3 is a graphical illustration of the particle size distributions which may be achieved using an anthracite coal by pressure crushing the material at various pressures in accordance with this invention.

As shown in FIGS. 3 and 4 the pressure used in the pressure crushing step may be varied according to the second bulk density and particle size distribution one desires to achieve. Thus, the pressure in the pressure crushing step can be varied from 1,000–20,000 pounds per square inch depending upon the characteristics desired in the final material. It has been found that for purposes of preparing the carbon material for use as electrodes in aluminum reduction cells, a pressure in the range from 4,000–6,000 pounds per square inch is most desirable. Higher pressures may be utilized in which case less fine particle size material would have to be added to obtain the desired particle size distribution and second bulk density but this would be more than offset by the increase in the cost of pressure crushing the material at that pressure.

A series of tests were run utilizing the three preferred starting materials for aluminum reduction cell electrodes to determine the reproducibility of the bulk density of the material when prepared in accordance with the instant invention. These results are shown in Table I.

TABLE I

| Type of raw material (+4 mesh before crushing) | Density duplns. under various condn., g./cc. | | |
|---|---|---|---|
| | Before press crushing | During press crushing at 5,000 p.s.i. | Vibration compaction of loose crushed aggreg. |
| Anthracite, gas calcined (ca. 1,200° C.). | 0.90<br>0.90<br>0.87<br>0.94 | 1.41<br>1.41<br>1.36<br>1.40 | 1.27<br>1.27<br>1.27<br>1.28 |
| Anthracite, elec. calcined (ca. 1,800° C.). | 0.83<br>0.86<br>0.82<br>0.84 | 1.37<br>1.41<br>1.42<br>1.41 | 1.15<br>1.14<br>1.15<br>1.15 |
| Petroleum coke, gas calcined (ca. 1,200° C.). | 0.55<br>0.54<br>0.54<br>0.58 | 1.34<br>1.30<br>1.34<br>1.35 | 1.01<br>1.01<br>1.01<br>1.02 |

In these tests a two piece steel mold eight inches tall and having a four and one-half inch inside diameter and six inch outside diameter was used. Pressures in excess of and including five thousand pounds per square inch were generated by a forty ton hydraulic press acting through close-fitting aluminum pistons in the mold.

The density values shown in Table I were obtained by measuring the volume (column height for a known area) of a given weight of +4 Tyler Screen Mesh raw material before and after pressure crushing. The vibration compacted densities were measured after vibrating the loose pressure crushed aggregate for one minute in a tall 1 liter graduated cylinder. The densities differ for material types because of their natural porosities. The most precise is the vibrated column method. The precision of the measurement of bulk density by this method is believed to be plus or minus 0.01 g./cc. As shown in Table I for the preparation of carbon material for anode and cathode electrodes in aluminum reduction cells, when the starting material is anthracite coal calcined at about 1200° C., the first bulk density is about 1.27 g./cc. after having been pressure crushed at 5000 p.s.i. in a confined chamber and subjected to vibration compaction for 1 minute. As also shown in Table I, when the starting carbon material is anthracite coal electrically calcined at about 1800° C., and subjected to pressure crushing in a confined chamber at about 5000 pounds per square inch pressure, the first bulk density is about 1.15 g./cc. after vibration compaction for 1 minute. When the starting carbon material is petroleum coke calcined at about 1200° C. and pressure crushed at 5000 p.s.i., the first bulk density is about 1.01 g./cc. after vibration compaction for 1 minute.

As has been indicated, the anthracite coal starting material is normally used in the aluminum industry for the preparation of cathode electrodes for the reduction cells. To the material prepared as shown in Table I fine particle size carbon material, i.e., carbon material comprising approximately 40% of a −100 +200 Tyler Screen Mesh fraction and approximately 60% of a −200 Tyler Screen Mesh fraction is added so that the amount of fine particle size material added will equal 23% of the resultant mixture. 11% of a suitable cokable carbonaceous binding agent such as pitch is added and under ideal conditions the resulting material will have a 1.61 g./cc. compressed green bulk density. The same amount of fine particle size material is added to the anthracite material electrically calcined at about 1800° C. and approximately 12% of a suitable cokable carbonaceous binding agent such as pitch is added resulting in a material which will have a 1.52–1.53 g./cc. compressed green bulk density. The petroleum coke material is normally used for the preparation of anodes in the aluminum reduction industry. To the petroleum coke which has been subjected to pressure crushing in a confined chamber in accordance with the instant invention enough coarse material, that is material of a +4 Tyler Screen Mesh particle size, and fine material is added so that the resultant mixture will have 20% of added coarse material and 20% of added fine particle size material. Approximately 15% of a suitable cokable carbonaceous binding agent is added so that the resultant material will have approximately a 1.68 g./cc. compressed green bulk density under ideal conditions.

In all instances, with carbon material prepared in accordance with the instant invention, there was no measurable increase in the level of inorganic contaminants such as iron in the carbon material.

A series of tests were run to determine the reproducibility of particle size distribution in material prepared according to the instant invention. The results of these tests are shown in Table II.

TABLE II

| Test No. | Tyler Screen Fractions | | | | | | | | |
|---|---|---|---|---|---|---|---|---|---|
| | +4 | −4<br>+8 | −8<br>+14 | −14<br>+28 | −28<br>+48 | −48<br>+100 | −100<br>+200 | −200 | Total |
| 1 | 34.7 | 18.1 | 18.9 | 13.1 | 7.3 | 4.2 | 1.6 | 2.1 | 100.0 |
| 2 | 34.7 | 19.1 | 17.9 | 13.3 | 7.1 | 4.7 | 1.6 | 1.6 | 100.0 |
| 3 | 34.5 | 17.9 | 18.9 | 13.2 | 7.4 | 4.3 | 1.7 | 2.1 | 100.0 |
| 4 | 35.0 | 18.7 | 17.7 | 13.2 | 7.1 | 4.7 | 1.6 | 1.8 | 100.0 |
| 5 | 34.9 | 17.5 | 19.2 | 13.2 | 7.3 | 4.2 | 1.6 | 2.1 | 100.0 |
| 6 | 34.0 | 20.0 | 17.7 | 13.1 | 7.0 | 4.6 | 1.7 | 1.7 | 100.0 |
| 7 | 33.3 | 18.4 | 19.7 | 13.4 | 7.3 | 4.2 | 1.6 | 2.1 | 100.0 |
| 8 | 34.7 | 19.2 | 17.8 | 13.3 | 7.0 | 4.6 | 1.6 | 1.8 | 100.0 |
| 9 | 34.3 | 17.9 | 19.2 | 13.2 | 7.3 | 4.3 | 1.7 | 2.1 | 100.0 |
| 10 | 34.0 | 19.1 | 18.3 | 13.3 | 7.1 | 4.6 | 1.7 | 1.9 | 100.0 |
| 11 | 34.4 | 19.4 | 17.8 | 13.3 | 7.1 | 4.5 | 1.7 | 1.8 | 100.0 |
| 12 | 35.4 | 18.6 | 17.7 | 13.1 | 7.0 | 4.5 | 1.8 | 1.9 | 100.0 |
| 13 | 34.2 | 18.6 | 19.0 | 13.1 | 7.2 | 4.1 | 1.6 | 2.2 | 100.0 |
| Average | 34.40 | 18.68 | 18.43 | 13.22 | 7.16 | 4.42 | 1.654 | 1.94 | |
| Std. Dev. 1σ | 1.69 | 0.61 | 0.89 | 0.21 | 0.34 | 0.20 | 0.05 | 0.56 | |
| | | | | | | | | | Avg. |
| Percent coeff. of var. 1σ (crushing and screening) | 4.90 | 3.27 | 4.80 | 1.59 | 4.75 | 4.52 | 3.03 | 29.0 | 6.98 |
| Percent coeff. of var. 1σ (screening only) | 3.24 | 1.40 | 2.65 | 2.14 | 2.20 | 3.58 | 0.6 | 9.0 | 3.10 |

These tests show that the precision for duplication of particle size distribution by pressure crushing of a given starting material is nearly equal to that of screening precision alone for the same distribution. The reproducibility of particle size distribution is significantly better than that in material prepared according to present day techniques.

Thus, it can be seen that the practice of this invention leads to consistent reproducibility of a desired particle size distribution and bulk density of the carbon materials being treated. It greatly reduces the handling of the material and the equipment expense as the elaborate and expensive to maintain crushing, milling, sizing and classifying equipment necessary for the conventional method of preparing carbon material for anode and cathode electrodes is substantially reduced. The contamination of the carbon material from the equipment is reduced to a point where it is no longer detectable by present day measuring techniques. The material prepared in accordance with the practice of this invention has stronger aggregate characteristics because of the preferential crushing of the weak or porous particles which leads to stronger electrode bodies. Less binder is required with the natural high density dove-tailed size distribution material achieved with the practice of this invention in order to produce the final electrode material.

It is to be understood that various changes and modifications may be made to the above outlined procedure and the instant invention is not to be limited except by the appended claims, wherein what is claimed is:

1. In the method for preparing carbon material for anode and cathode electrodes by blending various size fractions of a conventional carbon coke material to form a graded size distribution which gives a desired green bulk density, the improvement comprising:
   (a) crushing a charge of as-received coarse carbon material consisting essentially of 100% plus 4 Tyler screen mesh particle size in a confined chamber in a press under a pressure of from 1000–20,000 p.s.i. whereby the weaker particles crumble and fill in between the stronger particles until there is sufficient dove-tailing to bear the full pressure load without further degradation so as to obtain a natural and reproducible particle size distribution having a specific first bulk density; and
   (b) adding fine particle size carbon material so as to obtain the desired particle size distribution and second bulk density.

2. The method of claim 1 wherein the pressure is from 4,000–6,000 p.s.i.

3. The method of claim 1 wherein the coarse carbon material is anthracite coke calcined at about 1200° C. and the first bulk density is about 1.27 g./cc. after vibration compaction for one minute.

4. The method of claim 1 wherein the coarse carbon material is anthracite coke calcined at about 1800° C. and the first bulk density is about 1.15 g./cc. after vibration compaction for one minute.

5. The method of claim 1 wherein the coarse carbon material is petroleum coke calcined at about 1200° C. and the first bulk density is about 1.01 g./cc. after vibration compaction for one minute.

References Cited

UNITED STATES PATENTS 2,527,595   10/1950   Swallen et al. _____ 264—29 X

ROBERT F. WHITE, *Primary Examiner.*

J. H. SILBAUGH, *Assistant Examiner.*

U.S. Cl X.R.

264—29, 71; 252—502; 23—209.1; 241—25